Nov. 17, 1964 A. BLOOM ETAL Re. 25,688

DE-ICER BOOT FOR BREATHING MASK

Original Filed April 10, 1961

AARON BLOOM
WILLIAM D. MORTON, JR
INVENTORS

BY

Beehler & Shanahan
ATTORNEYS

United States Patent Office

Re. 25,688
Reissued Nov. 17, 1964

25,688
DE-ICER BOOT FOR BREATHING MASK

Aaron Bloom, Pasadena, and William D. Morton, Jr., Arcadia, Calif., assignors to Sierra Engineering Co., Sierra Madre, Calif., a corporation of California Original No. 3,073,302, dated Jan. 15, 1963, Ser. No. 102,025, Apr. 10, 1961. Application for reissue Mar. 2, 1964, Ser. No. 358,392
7 Claims. (Cl. 128—146)

Matter enclosed in heavy brackets [ ] appears in the original patent but forms no part of this reissue specification; matter printed in italics indicates the additions made by reissue.

The invention relates to respiratory apparatus and more particularly to a breathing mask of the type used by aircraft pilots for high altitude flying. More particularly the invention relates to an attachment or accessory for a high altitude breathing mask which surrounds the combined inhalation-exhalation valve housing immediately outside of the oro-nasal receptacle and is of such character as to inhibit to a substantial degree accumulation of frozen moisture derived from the gases exhaled by the pilot during use of breathing apparatus at high altitudes.

It has been recognized that when oxygen or breathing masks are used by aircraft flight personnel under conditions of high altitude flying, the oxygen or air supply directed into the mask passes oxygen or air for breathing at temperatures far below freezing. The temperatures actually experienced in fact are as low as 60 degrees below zero Fahrenheit and in some instances lower. As masks of this type are ordinarily constructed, the valving consists of a valve housing in which is incorporated two valves in combination, namely, an inflow check valve and an exhalation valve, one surrounding the other in the interest of maintaining compactness in the equipment. Since the gases exhaled from the lungs of the operator contain considerable moisture, the moisture tends to condense within the valve housing upon being expelled therefrom and under circumstances where the oxygen being supplied, for example, may be as low as 60 degrees below zero Fahrenheit, the extremely cold condition tends to chill the valve housing and component parts to such an extent that the moisture is frozen in and around the exhalation valving. On some occasions there is enough caking of frozen moisture to seriously impair the proper functioning of the mask or even to render the mask almost unusable unless the moisture can be broken away or the mask in a sense, de-iced.

In recognition of this necessity masks have been constructed with a de-icer boot integrally formed with the oro-nasal recetacle and the combined boot and receptacle then covered by the customary hard-shell modified to the extent that the hard shell also surrounds the de-icer boot. Although the presence of a de-icer boot in this form is of appreciable help in inhibiting the accumulation of ice around the combined inhalation-exhalation valve housing, the construction is such that the icing can be broken away only with considerable difficulty. In other words, it requires considerable effort for the operator with his gloved hand to distort the hard-shell sufficiently to fold and wrinkle the de-icer boot contained therein enough to break loose the ice.

Other disadvantages also exist in devices heretofore available in that the process of moulding a composite receptacle and de-icer boot together makes for a difficult moulding operation, expensive moulds, and time-consuming operations in stripping the mould, cleaning the composite moulded article, and thereafter attaching to it the necessary accessories, such, for example, as the valve housing. Even the step necessary for positioning and anchoring the resilient oro-nasal receptacle within the hard-shell has its detrimental features in that it is time-consuming, especially in arranging the hard-shell and the receptacle in a strictly proper relationship with respect to each other as a sub-assembly.

It is therefore among the objects of the invention to provide a new and improved de-icer boot for breathing masks which is constructed as a sub-assembly for attachment to the remaining mask assembly, thereby to greatly simplify the problems both of construction and assembly.

Another object of the invention is to provide a new and improved combined breathing mask and de-icer boot which are initially constructed as separate sub-assemblies and therafter joined together in operating relationship by virtue of providing connecting parts, all of which can be attached together by a single connecting means.

Still another object of the invention is to provide a new and improved combined breathing mask and de-icer boot wherein the inhalation-exhalation valve housing is so constructed that it serves as part of the means for interconnecting the de-icer boot with the mask sub-assembly, thereby to connect all of the parts by use of a single screw-threaded connection which extends through the passages normally considered as the supply passages to the oro-nasal receptacle.

Still further included among the objects of the invention is to provide a simple, separate de-icer boot capable of being assembled as a sub-assembly entirely separate and apart from the valve housing and the oro-nasal receptacle whether used with or without a surrounding hard-shell, the de-icer boot being such that after insertion of the valve housing within it, these parts can be quickly and easily attached together to the mask assembly by a connecting ring which serves not only to seal the connection between the several parts but which may also serve as a means of attaching the mounting bracket of a microphone contained within the mask assembly.

Also included among the objects of the inevntion is to provide a new and improved mask assembly wherein a combined mask and hard shell are formed to present a rigid platform at the lower forward portion upon which the valving sub-assembly can be mounted and subsequently removed therefrom when needed, the valve sub-assembly being so designed that it can include a separately moulded de-icing boot removably secured therearound.

With these and other objects in view, the invention consists in the construction, arrangement and combination of the various parts of the device, whereby the objects contemplated are attained, as hereinafter set forth, pointed out in the appended claims and illustrated in the accompanying drawings.

Figure 1:
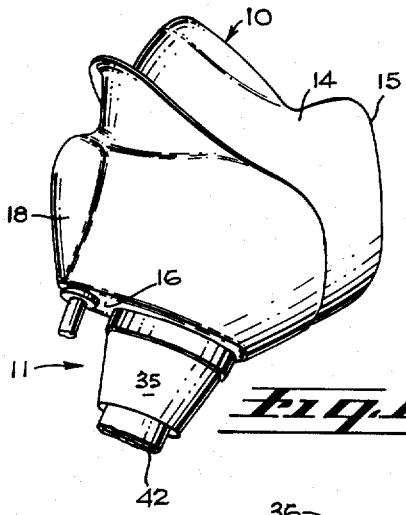
FIGURE 1 is a side perspective view of the combined breathing mask and de-icer boot in assembled condition.
Figure 2:
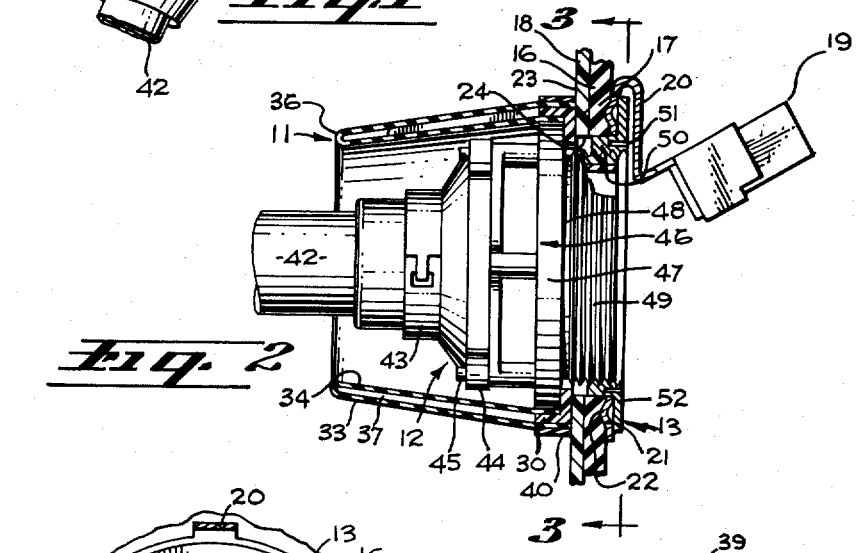
FIGURE 2 is a longitudinal sectional view of the assembled portions of the device with the mask assembly broken away.
Figure 3:
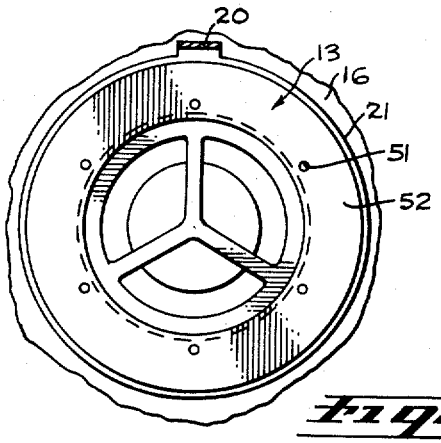
FIGURE 3 is a cross-sectional view taken on the line 3—3 of FIGURE 2.
Figure 5:
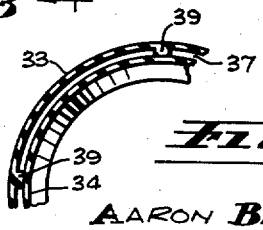
FIGURE 5 is a fragmentary cross-sectional view taken on the line 5—5 of FIGURE 4.

In an embodiment of the invention chosen for the purpose of illustration a combined breathing mask and de-icer boot is shown particularly in FIGURE 1 consisting of a mask assembly indicated generally by the reference character 10 and a de-icer boot assembly indicated generally by the reference character 11 joined together with the assistance of portions of a combined inhalation-exhalation valve housing 12, as shown in FIGURE 2. The connection is made by employment of a fastening sleeve indicated generally by the reference character 13 which threadedly engages the valve housing and holds all of the parts together in the manner illustrated in FIGURE 2.

The mask assembly 10 is built in conformance with accepted standards and consists of an oro-nasal face receptacle 14 which normally fits over the chin, mouth and nose of the user and is constructed, usually of relatively thin, flexible, resilient rubber or synthetic plastic material of comparable consistency. The receptacle is provided with a face-contacting sealing gasket 15 around the open end which fits the contour of the face of a user in accordance with well-known design. In the present embodiment the receptacle extends forward and terminates in what may be termed a hose attachment area 16, the inner portion of which may best be described as an annular mounting gasket 17. The gasket 17 provides a supply passage therethrough for the oro-nasal face receptacle.

Surrounding the forward portion of the receptacle is a hard-shell 18 constructed of a semi-rigid fiber-like hard board moulded to conform to the shape of the forward portion of the receptacle and distended outwardly to a degree in order not to compress any portion of the flexible receptacle inwardly. It will be understood that the receptacle has a chamber inside (not shown) which is large enough to permit free movement of the jaws and lips of the user so that he can talk readily and easily in order that his voice may be effectively picked up by a microphone 19 within the receptacle mounted upon a bracket 20 having a part thereof shaped like a washer 21 provided with a bead 22 to improve the ease of sealing when the parts are assembled in the manner shown in FIGURE 2.

The hard-shell 18 has a relatively flat outer area 23 in which is a passage 24 which coincides with the passage formed by the mounting gasket 17 and which also serves as a supply passage.

Figure 4:
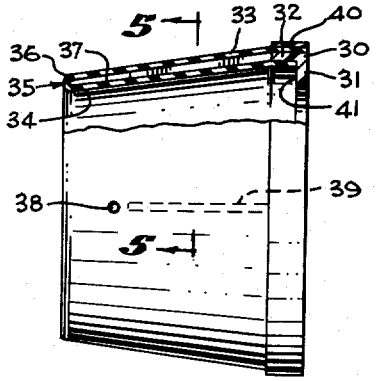
FIGURE 4 is a side elevational view of the de-icer boot sub-assembly partially broken away to show the interior construction.

The de-icer boot assembly identified in FIGURE 1 and shown in greater detail in FIGURES 2 and 4 consists of an annular mounting ring 30, preferably made of some hard synthetic plastic material, the ring being provided with an annular, relatively flat, transverse flange 31 and an annular axially extending flange 32 at its outer perimeter. The mounting ring serves as a means for interconnecting inside ends of an exterior wall 33 and an interior wall 34 in the form of a double walled sleeve 35. The outside ends of the walls 33 and 34 are joined together by a fold 36 so as to enclose an insulating space 37. Actually the exterior and interior walls comprise one continuous piece of flexible resilient sheet material of rubber-like consistency substantially the same as the material of the receptacle 14, although perhaps of slightly thinner gauge. A vent hole 38 is provided in order to equalize pressure outside and inside the sleeve so that it will not either balloon out or collapse with changing pressures. Ribs 39 are also provided between the walls so as to assure that they remain spaced from each other at all times, thereby to preserve the presence of the space 37.

The inside end of the exterior wall 33 overlies the axially extending flange 32 and is firmly held in position upon the flange by an annular band 40. The inside end of the interior wall 34 lies in engagement with the inside surface of the axially extending flange 32 and abuts against a face 41 of the transverse flange 31.

The valve housing 12 previously identified is adapted to have connected thereto a supply hose 42 of conventional construction by use of an appropriate clamp 43. A body 44 of the valve housing is attached by means of screws 45 to a connecting ring 46. The connecting ring has a cylindrical exterior 47 which presses lightly against the inside end of the interior wall 34, thereby tending to urge it into its position against the inside face of the axially extending flange 32. The connecting ring 46 is also provided with an annular flat face 48 which presses endwise against the transverse flange 31 when in assembled position.

For the purpose of connecting the parts together, the connecting ring 46 is provided with an exteriorly threaded sleeve 49 which extends through the passage 24 and the corresponding passage within the mounting gasket 17 to a position more or less flush with the inside face of the mounting gasket 17. The fastening sleeve 13 which lies inside the receptacle 14 has an interiorly threaded portion 50 which extends into the passage through the mounting gasket 17 and threadedly engages the exteriorly threaded sleeve 49 of the connecting ring 46. Wrench holes 51 may be provided to assist in rotating the fastening sleeve when the parts are assembled. In assembled condition a retaining edge 52 of the fastening sleeve overlies the washer 21 of the microphone bracket and perforce also overlies the mounting gasket 17 so that when it is screwed tightly into position the bead 22 will be forced into the mounting gasket to improve the seal so that the connection will be fully airtight. The force of application of the threaded members into engagement with each other at the same time draws the connecting ring against the mounting ring 30 and in turn presses the transverse flange 31 of the mounting ring into snug engagement with the exterior of the hard shell 18, in turn pressing the hard shell into engagement with the mounting gasket 17. This connection needs to be firm and positive but does not of necessity constitute the needed seal or sealing effect which is accomplished around the interior surface and the passage through the mounting gasket 17. The attachment of the de-icer boot in the manner described, however, does form a firm, positive mechanical attachment which is necessary and needful in the device.

When the assembly is to be made, normally the valve housing 12 is extended into the de-icer boot from the outside end by spreading or flexing the walls outwardly until the housing is well within the boot to a position where the exteriorly threaded sleeve 46 extends through the passage within the mounting ring 30. This combined sub-assembly then of the de-icer boot and the housing is applied to the exterior of the hard-shell so that the threaded sleeve 49 extends through the passage 24 and through the mounting gasket whereafter the fastening sleeve 13 is screwed into position until all parts are in firm, sealed assembly. Conversely, whenever disassembly might be needed, it is necessary only to unscrew the fastening sleeve, whereupon the de-icer boot and valve housing is released from the mask assembly 10. Inasmuch as the de-icer boot assembly is a separate unitary part, all of the de-icer boots are interchangeable with the valve housings and both of these in turn are interchangeable with the mask assemblies. The parts thus described comprise accordingly a very useful composite device easily made up in respect to the component parts and in a form which renders sub-assembly as well as ultimate assembly a relatively simple non-complicated operation. Moreover, by reason of the fact that the entire exterior of the de-icer boot is entirely exposed, it can be very easily flexed by manipulation of the gloved hand of the user whenever it might be needed to dislodge ice which from time to time accumulates around the exterior of the valve housing as the device is operated in sub-zero surroundings.

The invention hereinabove described may be viewed as a split version type of oxygen mask. The valve assembly and hard-shell, when integrated with one another, provide a rigid platform for containing all the components of the basic mask assembly; whereas in previous concepts, valving has always been contained with rather flaccid rubber boss-like arrangements. Applicants' arrangement also provides for easy removal and replacement of the valving mechanism, hoses, etc., whereas in previous designs it has been a difficult problem because of the necessity to engage rather loose and pliable rubber bosses and compress them without the benefit of a rigid platform.

Further advantageous results stem from the simplification of the manufacturing procedure, as well as simplifying the tooling required for molding the rubber face-pieces. When the need arises to mold a two-piece configuration of the type herein disclosed, the mold can be relatively simple with a minimum of moving parts, whereas in the case of a mask with an integrated de-icer boot the mold must be manufactured with at least several moving parts. This projects a problem of indexing and provides areas of potential wear.

In addition to the above, a two-piece mask construction simplifies the manufacture of the hard-shell configuration because of simplifying the tooling. Basically, the configuration required for a split version mask allows a simple conical shape with a minimum of drafting problems. If it is elected to mold the hard-shell, as has been done in the past, the tooling will be considerably simpler by virtue of the lack of necessity to project the de-icer boot protective hard-shell.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A breathing mask assembly comprising an oro-nasal receptable of flexible material having a chamber therein, a face contacting sealing gasket on one side of the receptacle and a hose attachment area on the other side thereof, an annular mounting gasket for a supply tube on said other side defining an inhalation-exhaltion passage, a de-icer boot comprising an annular mounting ring adapted to be positioned against said hose attachment area, a sleeve of flexible material having a free outside end and an inside end, said sleeve comprising an exterior wall having an inside end impressed against the exterior of said mounting ring and an interior wall having an inside end lying against the interior of said mounting ring, outside ends of said walls being joined together and enclosing an insulating space between said walls, a supply tube having an inhalation-exhalation valve housing thereon, said housing having a position within said boot, said housing comprising a connecting ring having a cylindrical exterior positioned against the inside end of the interior wall and an end face in engagement with the mounting ring, and a fastening sleeve having a retaining edge overlying the inside of said mounting gasket, said fastening ring having a threaded engagement with said connecting ring of the valve housing whereby said de-icer boot and the valve housing are simultaneously releasably attached to the receptacle in sealed position around the inhalation-exhalation passage.

2. A breathing mask assembly comprising an oro-nasal receptacle of flexible material having a chamber therein, a face contacting sealing gasket on one side of the receptacle and a hose attachment area on the other side thereof, an annular mounting gasket for a supply tube on said other side defining an inhalation-exhalation passage, a de-icer boot comprising a mounting ring having an annular relatively flat transverse flange adapted to be positioned against said end face of the hard shell and having an annular axially extending flange at the outer perimeter, a sleeve of flexible material having a free outside end and an inside end, said sleeve comprising an exterior wall having an inside end impressed against the exterior of said axially extending flange and an interior wall having an inside end lying against the interior of said axially extending flange, outside ends of said walls being joined together and enclosing an insulating space between said walls, a supply tube having an inhalation-exhalation valve housing thereon, said housing having a position within said boot, said housing comprising a connecting ring having a cylindrical exterior positioned against the inside end of the interior wall and an end face in engagement with the transverse flange of the mounting ring, and a fastening sleeve having a retaining edge overlying the inside of said mounting gasket, said fastening ring having a threaded engagement with said connecting ring of the valve housing whereby said de-icer boot and the valve housing are simultaneously releasably attached to the receptacle in sealed position around the inhalation-exhalation passage.

3. A breathing mask assembly comprising an oro-nasal receptacle of flexible material having a chamber therein, a face contacting sealing gasket on one side of the reecptacle and a hose attachment area on the other side thereof, an annular mounting gasket for a supply tube on said other side defining an inhalation-exhalation passage and a hard shell extending over the exterior of the receptacle including an end face having a passage therethrough coinciding with said inhalation-exhalation passage, a de-icer boot comprising an annular mounting ring adapted to be positioned against said end face of the hard shell, a sleeve of flexible material having a free outside end and an inside end, said sleeve comprising an exterior wall having an inside end impressed against the exterior of said mounting ring and an interior wall having an inside end lying against the interior of said mounting, outside ends of said walls being joined together and enclosing an insulating space between said walls, a supply tube having an inhalation-exhalation valve housing thereon, said housing having a position within said boot, said housing comprising a connecting ring having a cylindrical exterior positioned against the inside end of the interior wall and an end face in engagement with the mounting ring, and a fastening sleeve having a retaining edge overlying the inside of said mounting gasket, said fastening ring having a threaded engagement with said connecting ring of the valve housing whereby said de-icer boot and the valve housing are simultaneously releasably attached to the receptacle and the hard shell in sealed position around the inhalation-exhalation passage.

4. A breathing mask assembly comprising an oro-nasal receptacle of flexible material having a chamber therein, a face contacting sealing gasket on one side of the receptacle and a hose attachment area on the other side thereof, an annular mounting gasket for a supply tube on said other side defining an inhalation-exhalation passage and a hard shell extending over the exterior of the receptacle, said hard shell including a flat end face having a passage therethrough coinciding with said inhalation-exhalation passage, a de-icer boot comprisng a mounting ring having an annular relatively flat transverse flange adapted to be positioned against said end face of the hard shell and having an annular axially extending flange at the outer perimeter, a sleeve of flexible material having a free outside end and an inside end, said sleeve comprising an exterior wall having an inside end impressed against the exterior of said axially extending flange and an interior wall having an inside end lying against the interior of said axially extending flange, outside ends of said walls being joined together and enclosing an insulating space between said walls, a supply tube having an inhalation-exhalation valve housing thereon, said housing having a position within said boot, said housing comprising a connecting ring having a cylindrical exterior positoned against the inside end of the interior wall and an end face in engagement with the transverse flange of the mounting ring, a microphone bracket in the chamber having a portion thereof overlying said mounting gasket and surrounding said inhalation-exhalation passage, and a fastening sleeve having a retaining edge overlying said portion of the bracket and the inside of said mounting gasket, said fastening ring having a threaded engagement with said connecting ring of the valve housing whereby said de-icer boot and the valve housing are simultaneously releasably attached to the receptacle and the hard shell in sealed position around the inhalation-exhalation passage.

*5. A breathing mask assembly comprising an oro-nasal receptacle having a chamber therein, a hose attachment*

*area having a passage therethrough for a supply tube defining an inhalation-exhalation passage, an inhalation-exhalation valve housing and releasable attachment means in engagement respectively with said attachment area and said valve housing adapted to secure said housing to the mask, and a de-icer boot comprising a flexible double-walled sleeve including an inside wall and an outside wall joined together at free ends thereof and providing a space therebetween, said walls at ends opposite said free ends being secured to said receptacle in a position surrounding said valve housing.*

*6. A breathing mask assembly comprising an oro-nasal receptacle having a chamber therein, a face contacting sealing gasket on one side of the receptacle and a hose attachment area on the other side thereof, an annular mounting area for a supply tube on said other side defining an inhalation-exhalation passage, a de-icer boot comprising an annular mounting ring assembly adapted to be positioned against said hose attachment area, a sleeve of flexible material having a free outside end and an inside end, said sleeve comprising an exterior wall having an inside end forming part of said mounting ring assembly and an interior wall having an inside end forming part of said mounting ring assembly, outside ends of said walls being joined together and enclosing an insulating space between said walls, a supply tube having an inhalation-exhalation valve housing thereon, said housing having a position within said boot, said housing comprising a connecting ring having an exterior flange positioned against the mounting ring assembly, and a fastening sleeve having a retaining edge overlying the inside of said mounting area, said fastening sleeve having a retention engagement with said valve housing whereby said de-icer boot and the valve housing are simultaneously releasably attached to the receptacle around the inhalation-exhalation passage.*

*7. A breathing mask assembly comprising an oro-nasal receptacle having a chamber therein, a hose attachment area having a passage therethrough for a supply tube defining an inhalation-exhalation passage, an inhalation-exhalation valve housing and releasable attachment means in engagement respectively with said attachment area and said valve housing adapted to secure said housing to the mask, and a de-icer boot comprising a flexible double-walled sleeve including an inside wall and an outside wall joined together at free ends thereof and providing a space therebetween, said walls at ends opposite said free ends being secured to said receptacle in a position surrounding said valve housing, said double walled sleeve having vent means therein, and spacers between said inside wall and said outside wall holding walls in non-collapsing relationship.*

References Cited by the Examiner

The following references, cited by the Examiner, are of record in the patented file of this patent or the original patent.

UNITED STATES PATENTS

| | | | |
|---|---|---|---|
| 2,440,943 | 5/48 | Gonsett | 137—377 |
| 2,898,908 | 8/59 | Sovinsky | 128—141 |
| 2,942,602 | 6/60 | Seeler | 128—146 |

RICHARD A. GAUDET, *Primary Examiner.*